United States Patent [19]

Cunningham et al.

[11] Patent Number: 4,826,908

[45] Date of Patent: May 2, 1989

[54] COMPOSITIONS OF LINEAR POLYETHYLENE AND ETHYLENE-VINYL ALCOHOL POLYMER AND FILMS HAVING REDUCED BLOCKING

[75] Inventors: Theresa L. Cunningham, Manalapan, N.J.; Richard G. Shaw, Remsen, N.Y.; Tien-Kuei Su, Belle Mead, N.J.

[73] Assignee: Mobil Oil Corporation, New York, N.Y.

[21] Appl. No.: 139,412

[22] Filed: Dec. 30, 1987

[51] Int. Cl.[4] .............................................. C08K 3/34
[52] U.S. Cl. ..................................... 524/448; 525/57
[58] Field of Search ........................... 524/448; 525/57

[56] References Cited

U.S. PATENT DOCUMENTS

| | | | |
|---|---|---|---|
| 3,125,547 | 3/1964 | Blatz | 260/45.5 |
| 3,847,728 | 11/1974 | Hirata et al. | 525/57 |
| 3,894,985 | 7/1975 | Coombs | 524/448 |
| 4,076,698 | 2/1978 | Anderson et al. | 528/348.6 |
| 4,293,473 | 10/1981 | Eastman | 525/57 |
| 4,610,914 | 9/1986 | Newsome | 428/516 |

FOREIGN PATENT DOCUMENTS

| | | | |
|---|---|---|---|
| 655451 | 1/1963 | Canada | 524/448 |
| 57738 | 4/1982 | Japan | 524/448 |

*Primary Examiner*—Edith Buffalow
*Attorney, Agent, or Firm*—Alexander J. McKillop; Charles J. Speciale; Michael J. Mlotkowski

[57] ABSTRACT

The extrudability of linear polymers of ethylene such as low density copolymers of ethylene and $C_4$—$C_{10}$ olefins (LLDPE) into thin films is improved by adding small amounts, e.g., 0.02 to 2 weight percent ethylene-vinyl polymer to reduce melt fracture, head pressure and to obtain films having excellent anti-blocking characteristics. Optionally, diatomaceous earth is added to further reduce blocking.

15 Claims, No Drawings

COMPOSITIONS OF LINEAR POLYETHYLENE AND ETHYLENE-VINYL ALCOHOL POLYMER AND FILMS HAVING REDUCED BLOCKING

BACKGROUND OF THE INVENTION

Linear ethylene polymers such as low density polyethylenes (LLDPE) are widely used in the extrusion of films because of their superior properties compared to high pressure polyethylene (LDPE). However, there are persistent problems in the commercial exploitation of LLDPE resins due to difficulties in extrusion. For example, high back pressure and torque due to extremely high shear viscosity of the linear ethylene polymer are encountered. Furthermore, the extruded films exhibit surface distortion related to melt fracture. Accordingly, much effort has been devoted to finding additives, modifying extrusion conditions and changing die materials in order to alleviate some of the problems. For example, U.S. Pat. No. 3,125,547, which is incorporated by reference, discloses the use of a hexafluoropropylene-vinylidene fluoride copolymer as a film processing aid and broadly suggests a variety of other fluorinated polymers for the same purpose.

The invention relates to the use of ethylene-vinyl alcohol as an economical processing aid which improves the extrusion characteristics of linear ethylene polymers by reducing melt fracture and head pressure, and results in a film having excellent anti-blocking characteristics.

SUMMARY OF THE INVENTION

The extrudability of linear polymers of ethylene into thin films is improved by adding a ethylene-vinyl alcohol polymer (EVAL) in small amounts of up to about 2 weight percent sufficient to reduce melt fracture, head pressure, and to give films having reduced blocking. Optionally, diatomaceous earth is added to further reduce blocking. The invention relates to both polymer compositions and the films made by extrusion of the compositions and having improved anti-blocking properties.

DETAILED DESCRIPTION OF THE INVENTION

The linear ethylene polymers which are suitable for use in this invention are known materials which are widely commercially available. The preparation of suitable polymers is described in U.S. Pat. No. 4,076,698, which is incorporated herein by reference. Suitable polymers are generally prepared under low pressure conditions using Ziegler-Natta catalysts or chromium oxide catalysts. The linear polymers are either homopolymers of ethylene or copolymers of ethylene and higher alpha-olefins containing 4 to 10 carbon atoms. This invention is particularly concerned with linear low density polyethylenes which are copolymers having a density between 0.90 and 0.94, preferably between 0.91 and 0.93.

The ethylene-vinyl alcohol copolymers used in this invention which are commercially available are the saponified or hydrolyzed product of an ethylene-vinyl acetate copolymer having, generally, an ethylene content of 25 to 75 mole percent. It is preferred that the percent ethylene in the EVAL is at least 45 percent. The degree of hydrolysis should react at least 96 percent, preferably at least 99 percent.

The ethylene-vinyl alcohol polymer can be blended with the linear ethylene polymer in any suitable manner. It has been found to be advantageous to prepare a masterbatch containing the linear ethylene polymer which is rich in the ethylene-vinyl alcohol polymer for blending with additional ethylene polymer to achieve the desired concentration of the additives.

The invention is illustrated by the following non-limiting examples.

EXAMPLES 1-5

These examples illustrate the use of EVAL polymers alone to reduce blocking of LLDPE films and to improve extruder performance.

The linear polyethylene used in the examples was hexene copolymer of polyethylene from Mobil (NTA-101; MI=1 and density=0.918 g/cm$^3$) and vinyl alcohol polymer is EVOH from EVAL Co. of America. Processability and extrudate quality were evaluated using the ¾ inch Brabender extruder and the 2½ inch Sterling extruder at 50 RPM. The results are shown in Table 1 and Table 2, respectively. The incorporation of low levels of EVOH unexpectedly improves processability with a reduction of head pressure, torque or motor amperage. In addition, the surface distortion of the extrudates can be completely eliminated with a remarkable reduction in blocking.

TABLE 1

| Ex. | % EVAL | Output Rate g/min. | Torque Mg | P psi | Shear Rate Sec$^{-1}$ | Quality |
|---|---|---|---|---|---|---|
| C-1 | 0* | 18.2 | 4300 | — | 116 | Distorted |
| C-2 | 0** | 24.2 | 4100 | 4100 | 174 | Badly Distorted |
| 1 | 0.25* | 17.4 | 3800 | — | 111 | Smooth |
| 2 | 0.50* | 17.5 | 3750 | — | 112 | Smooth |
| 3 | 0.50** | 24.6 | 3700 | 3920 | 177 | Smooth |

TABLE 2

| EX. | % EVAL | P psi | Motor Current, amp | Quality | 1% Secant Modulus, psi MD | 1% Secant Modulus, psi TD | Blocking Force |
|---|---|---|---|---|---|---|---|
| C-3 | 0 | 4240 | 42 | Badly Distorted | 33,200 | 37,300 | 210 |
| 4 | 1* | 3810 | 39 | Smooth | 39,800 | 46,200 | 10 |
| 5 | 2** | 3620 | 36 | Smooth | 39,300 | 45,000 | 50 |

Output rate was 5.8 lb/hr/in. die
*EP-E Grade EVAL
**EP-G Grade EVAL

EXAMPLE 7

This example illustrates the use of both EVAL polymers and diatomaceous earth to prepare films with markedly reduced blocking.

The same LLDPE as used in Examples 1-6 was blown alone, with EVAL and with both EVAL and diatomaceous earth using the 2½ inch Sterling extruder with 6 inch annular die. The induced reduced blocking force (the peeling force required to separate the films) was measured. The results are summarized in Table 3.

TABLE 3

| Example | Additive | Amount, ppm | Inducing Blocking, g |
|---|---|---|---|
| C-4 | — | — | 134 |
| C-5 | Superfloss | 5000 | 93 |
| C-6 | Superfloss | 7500 | 72 |

TABLE 3-continued

| Example | Additive | Amount, ppm | Inducing Blocking, g |
|---|---|---|---|
| 6 | EVAL | 5000 | 110 |
| 7 | Superfloss/EVAL | 5000/5000 | 43 |

Although this invention has been described with preferred embodiments, it is to be understood that modifications and variations can be made without departing from the spirit and scope of this invention, as those skilled in the art will readily understand. Such modifications and variations are considered to be within the purview and scope of the appended claims.

We claim:

1. A composition comprising a linear polyethylene polymer and 0.02 to 2 weight percent of ethylene-vinyl alcohol polymer which is effective to reduce blocking of the linear polyethylene polymer when extruded into a thin film.

2. The composition of claim 1 in which said linear polyethylene polymer is a copolymer of ethylene and a higher olefin containing 4 to 10 carbon atoms, having a density of 0.90 to 0.94.

3. The composition of claim 1 in which said linear polyethylene is a copolymer of ethylene and butene having a density of 0.90 to 0.94.

4. The composition of claim 1 in which said linear polyethylene is a copolymer of ethylene and hexene having a density of 0.90 to 0.94.

5. The composition of claim 1 in which said linear polyethylene is a copolymer of ethylene and octene having a density of 0.90 to 0.94.

6. An extruded film comprising a linear ethylene polymer and 0.02 to 2 weight percent of an ethylene-vinyl alcohol polymer and having reduced blocking compared to a film of the same ethylene polymer without said ethylene-vinyl alcohol polymer.

7. The film of claim 6 in which said linear polyethylene polymer is a copolymer of ethylene and a higher olefin containing 4 to 10 carbon atoms, having a density of 0.90 to 0.94.

8. The film of claim 6 in which said linear polyethylene is a copolymer of ethylene and butene having a density of 0.90 to 0.94.

9. The film of claim 6 in which said linear polyethylene is a copolymer of ethylene and hexene having a density of 0.90 to 0.94.

10. The film of claim 6 in which said linear polyethylene is a copolymer of ethylene and octene having a density of 0.90 to 0.94.

11. The film of claim 6 which also contains up to 1 weight percent of diatomaceous earth.

12. The film of claim 7 which also contains up to 1 weight percent of diatomaceous earth.

13. The film of claim 8 which also contains up to 1 weight percent of diatomaceous earth.

14. The film of claim 9 which also contains up to 1 weight percent of diatomaceous earth.

15. The film of claim 10 which also contains up to 1 weight percent of diatomaceous earth.

* * * * *